United States Patent
Ikoma et al.

(10) Patent No.: US 7,201,792 B2
(45) Date of Patent: Apr. 10, 2007

(54) WATER BASED INK COMPOSITION FOR WRITING INSTRUMENT

(75) Inventors: Hideyuki Ikoma, Yokohama (JP); Satoshi Sakuma, Yokohama (JP); Junichi Shinozawa, Yokohama (JP)

(73) Assignee: Mitsubishi Pencil Co., Ltd., Tokyo (JP)

( * ) Notice: Subject to any disclaimer, the term of this patent is extended or adjusted under 35 U.S.C. 154(b) by 0 days.

(21) Appl. No.: 10/786,603

(22) Filed: Feb. 26, 2004

(65) Prior Publication Data

US 2004/0250728 A1 Dec. 16, 2004

(30) Foreign Application Priority Data

Feb. 27, 2003 (JP) ............................. 2003-051379

(51) Int. Cl.
*C09D 11/18* (2006.01)
(52) U.S. Cl. ................ 106/31.58; 106/31.86; 106/31.59; 106/31.89; 401/209
(58) Field of Classification Search ............ 106/31.58, 106/31.59, 31.86, 31.89
See application file for complete search history.

(56) References Cited

U.S. PATENT DOCUMENTS

| | | | | |
|---|---|---|---|---|
| 4,793,860 A * | 12/1988 | Murakami et al. | ....... | 106/31.52 |
| 4,966,628 A * | 10/1990 | Amon et al. | ................. | 524/555 |
| 5,203,913 A * | 4/1993 | Yamamoto et al. | ......... | 524/560 |
| 5,412,021 A * | 5/1995 | Nakanishi | .................... | 524/523 |
| 5,554,212 A * | 9/1996 | Bui et al. | ...................... | 524/27 |
| 5,814,140 A * | 9/1998 | Reisacher et al. | ....... | 106/31.89 |
| 5,830,263 A * | 11/1998 | Hale et al. | ................ | 106/31.27 |
| 6,193,792 B1 * | 2/2001 | Fague | ..................... | 106/31.65 |
| 6,261,353 B1 * | 7/2001 | Doi et al. | ................... | 106/31.6 |
| 2004/0182278 A1 * | 9/2004 | Kwan et al. | ............. | 106/31.13 |

FOREIGN PATENT DOCUMENTS

JP   10-195363   7/1998

OTHER PUBLICATIONS

McCutcheon's, 1972, Allured Publishing Corp., pp. 134 and 180.*

* cited by examiner

*Primary Examiner*—J. A. Lorengo
*Assistant Examiner*—Veronica Faison-Gee
(74) *Attorney, Agent, or Firm*—Buchanan, Ingersoll & Rooney PC

(57) ABSTRACT

Provided is a water-based ink composition for a writing instrument comprising at least a colorant and water, wherein a nonionic high molecular surfactant having an alkylene oxide chain as a hydrophilic group and having an average molecular weight of 3000 to 200,000 is added to the ink composition in a range of 0.1 to 30% by weight. The above nonionic high molecular surfactant has preferably an HLB of 8 or more or a cloud point of 50° C. or higher and includes N-polyoxyalkylene-polyalkylenepolyamine and a polyoxyethylene-polyoxypropylene block polymer.

3 Claims, No Drawings

WATER BASED INK COMPOSITION FOR WRITING INSTRUMENT

TECHNICAL FIELD

The present invention relates to a water-based ink composition for a writing instrument, more specifically to a water-based ink composition for a writing instrument which is excellent in a non-feathering property, writing feeling and physical property stability and which is suited to a ballpoint pen, a marking pen and a fountain pen.

BACKGROUND ART

When preparing a water-based ink for a writing instrument, particularly when preparing it in a low viscosity area (50 mPa·s or less: measured (25° C.) by means of an ELD type viscometer manufactured by Tokimec Inc.), the kind and the addition amount of materials having a large penetrating speed into paper such as surfactants having a low molecular weight of 3000 or less have so far been restricted because a non-feathering property brought about by a viscosity effect can not be expected.

However, in the case of a ballpoint pen in which metal lubricity between a ball and a tip holder is required, a surfactant has to be indispensably added. However, addition of a surfactant in an amount enough to satisfy the metal lubricity results in deteriorating the non-feathering property.

Also, in the case of a marking pen having a mechanism requiring no metal lubricity, there is the problem that the drawn lines are blurred by an effect brought about by an emulsifier adsorbed to a colored emulsion which is used as a colorant.

Further, it is possible to improve a non-feathering property by turning an ink viscosity into a non-Newtonian viscosity. Particularly in the case of a pigment ink, depending on the kind of a non-Newtonian viscosity-providing agent, the drawn lines have a good quality, but color separation is caused by settling of the pigment with the passage of time at a high temperature, or while settling of the pigment with the passage of time at a high temperature is prevented, blobbing and splitting in the drawn lines are brought about so that the drawn lines are reduced in a quality, and the writing feeling is not improved even by adding a low molecular surfactant. Thus, there exists the problem that all qualities can not be satisfied at the same time.

On the other hand, a water-based ink for a ballpoint pen comprising at least a colorant, water and polyoxyethylene styrenated phenyl ether is disclosed in Japanese Patent Application Laid-Open No. 195363/1998 as a water-based ink which inhibits blobbing and which prevents a ball holder to the utmost from being abraded by rotation of the ball to thereby secure a sufficient discharge amount of the ink and make a lot of writing possible.

However, polyoxyethylene styrenated phenyl ether added to the water-based ink for a ballpoint pen described in the patent gazette described above is used primarily as a lubricant in order to prevent the ball holder to the utmost from being abraded by rotation of the ball in the ballpoint pen tip, and it is not added for improving the non-feathering property, the writing feeling and the physical property stability of the ink.

In the present invention, a nonionic high molecular surfactant having an alkylene oxide chain as a hydrophilic group and having an average molecular weight of 3000 to 200,000 is used as described later, and it is apparently different in action and physical properties from the compound described above.

DISCLOSURE OF THE INVENTION

In light of the problems on the conventional art described above, the present invention intends to solve them, and an object thereof is to provide a water-based ink composition for a writing instrument in which a composition does not change in storing over a long period of time when used for a writing instrument having a mechanism to discharge an ink by bringing into direct contact with a paper face and which is notably improved in writing feeling and a non-feathering property.

Intensive researches on the foregoing problems conducted out by the present inventors have resulted in finding that a water-based ink composition for a writing instrument which meets the object described above can be obtained by adding a nonionic high molecular surfactant having specific physical properties in a specific amount to an ink composition comprising at least a colorant and water, and thus the present invention has come to be completed.

That is, the present invention comprises the following items (1) to (7).

(1) A water-based ink composition for a writing instrument comprising at least a colorant and water, wherein a nonionic high molecular surfactant having an alkylene oxide chain as a hydrophilic group and having an average molecular weight of 3000 to 200,000 is added to the ink composition in a range of 0.1 to 30% by weight.

(2) The water-based ink composition for a writing instrument as described in the above item (1), wherein the nonionic high molecular surfactant has an HLB of 8 or more or a cloud point of 50° C. or higher.

(3) The water-based ink composition for a writing instrument as described in the above item (1) or (2), wherein the nonionic high molecular surfactant is N-polyoxyalkylenepolyalkylenepolyamine.

(4) The water-based ink composition for a writing instrument as described in the above item (1) or (2), wherein the nonionic high molecular surfactant is a polyoxyethylene-polyoxypropylene block polymer.

(5) A ballpoint pen using the water-based ink composition for a writing instrument as described in any of the above items (1) to (4).

(6) A marking pen using the water-based ink composition for a writing instrument as described in any of the above items (1) to (4).

(7) A fountain pen using the water-based ink composition for a writing instrument as described in any of the above items (1) to (4).

According to the present invention, provided are a water-based ink composition which is excellent in all of writing feeling, a non-feathering property and physical property stability, and a ballpoint pen, a marking pen and a fountain pen each using the water-based ink composition having the above excellent effect.

BEST MODE FOR CARRYING OUT THE INVENTION

The embodiment of the present invention shall be explained below in details.

The water based ink composition for a writing instrument of the present invention comprises at least a colorant and water, wherein a nonionic high molecular surfactant having an alkylene oxide chain as a hydrophilic group and having an average molecular weight of 3000 to 200,000 is added to the ink composition in a range of 0.1 to 30% by weight. It is suitably filled into the ink reservoirs of writing instruments such as a ballpoint pen, a marking pen and a fountain pen and used as a water-based ink composition for a writing instrument of the type of contacting directly with a paper face.

The nonionic high molecular surfactant used in the present invention markedly improves writing feeling, a non-feathering property and physical property stability of a writing instrument such as a ballpoint pen, a marking pen and a fountain pen, particularly the physical property stability of a pigment ink provided with a non-Newtonian viscosity.

The nonionic high molecular surfactant used in the present invention shall not specifically be restricted as long as it has an alkylene oxide chain as a hydrophilic group and has an average molecular weight of 3000 to 200,000, and it is preferably N-polyoxyalkylene-polyalkylenepolyamine or a polyoxyethylene-polyoxypropylene block polymer.

In particular, N-polyoxyalkylene-polyalkylenepolyamine represented by the following Formula (I) is preferably used:

  (I)

wherein PO is propylene oxide; EO is ethylene oxide; n, x and y are positive numbers, and the respective positive numbers are determined in the range of the foregoing average molecular weight of 10,000 to 200,000.

The nonionic high molecular surfactant which can specifically be used includes Discol (a brand name: manufactured by Daiichi Kogyo Seiyaku Co., Ltd.) N-509 (average molecular weight: 20,000, HLB: 9), N-512 (average molecular weight: 30,000, HLB: 12), N-515 (average molecular weight: 50,000, HLB: 15), N-518 (average molecular weight: 80,000, HLB: 18) and N-520 (average molecular weight: 40,000, HLB: 20) which are N-polyoxyalkylenepolyalkylenepolyamine represented by Formula (I) described above and Epan (a brand name: manufactured by Daiichi Kogyo Seiyaku Co., Ltd.) 485 (average molecular weight: 8000, cloud point: 100° C. or higher), Epan 680 (average molecular weight: 8750, cloud point: 100° C. or higher), Epan 740 (average molecular weight: 3333, cloud point: 55° C.), Epan 750 (average molecular weight: 4000, cloud point: 70° C.) and Epan 785 (average molecular weight: 13333, cloud point: 100° C. or higher) which are polyoxyethylenepolyoxypropylene (EOPO) block polymers.

The performances such as (1) writing feeling, (2) a non-feathering property and (3) physical property stability provided by the nonionic high molecular surfactant having the characteristics described above used in the present invention shall be described below in details.

(1) In the case of a ballpoint pen, lubricity between a ball and a tip holder and lubricity between paper and the ball contribute to a large extent to the writing feeling as factors exerting an influence thereon. Usually, if the lubricity between the ball and the tip holder is expected, the content of the nonionic high molecular surfactant has to be increased, but in respect to the lubricity between paper and the ball, the content is not required so much. In the case of a marking pen and a fountain pen each equipped with a pen feed, lubricity between paper and an ink discharge part contributes to the writing feeling to a large extent, and therefore the effect of the surfactant described above can be expected as is the case with the ballpoint pen. The details of a lubricative mechanism between paper and a ball (or a pen feed) is not certain, but it is inferred that an alkylene oxide chain in a molecule is hydrated with water to reduce bonding strength of a hydrogen bond between cellulose fibers when the molecule is discharged onto a paper face, which softens the paper itself to enhance lubricity with the ball.

In the present invention, a lubricative effect between paper and the ball depends on an HLB or a cloud point and an average molecular weight of the nonionic high molecular surfactant used having the characteristics described above. Accordingly, the nonionic high molecular surfactant having an HLB of 8 or more is preferably used in the present invention, or the surfactant having a cloud point of 50° C. or higher is preferably used. If the surfactant having an HLB of less than 8 is used, it is difficult to dissolve the surfactant in the vehicle, and the effects thereof can not sufficiently be exerted in a certain case. If the surfactant having a cloud point of lower than 50° C. is used, the ink system is likely to be broken when the writing instrument is stored at 50° C. or higher.

An average molecular weight of the nonionic high molecular surfactant in the present invention has to be 3,000 to 200,000 and is preferably 5,000 to 100,000.

If the average molecular weight is less than 3,000, the alkylene oxide chain is short, and therefore the swelling effect on paper is small. On the other hand, if it exceeds 200,000, the ink is increased in a viscosity, and an ink discharge amount of the pen is decreased. Accordingly, both are not preferred.

(2) The nonionic high molecular surfactant used in the present invention can enhance the writing feeling as well as markedly raise the non-feathering property. The water-based ink composition according to the present invention is stuck onto paper with making direct contact with a paper face by a ballpoint pen, a marking pen and a fountain pen, and therefore writing is carried out in the way of pushing aside the fibers of the paper so that a radius of capillary tubes in the paper is enlarged. Accordingly, the ink penetrating speed is faster than in an ink jet system in which an ink is stuck onto paper by jetting droplets and in which an external stress is not exerted on paper fibers, and the state is severer as far as the non-feathering property is concerned.

In the present invention, the details of the mechanism of the non-feathering property are not clear. An alkylene oxide chain present in a molecule of the nonionic high molecular surfactant used is long, and therefore the polymer can not penetrate into paper because of an influence of a water molecule hydrated to the part thereof and is present on a paper face. A hydrophobic group part of a low molecular surfactant can adsorb on a hydrophobic group of a high molecular surfactant, and the high molecular surfactant does not penetrate into a paper face by an influence of alkylene oxide. Thus, as a result, the low molecular surfactant is inhibited from penetrating into a paper face. Accordingly, in the water-based ink system containing the nonionic high molecular surfactant of the present invention, a content of the low molecular surfactant can be relatively increased, which makes it possible to satisfy the non-feathering property and the smooth writing feeling at the same time.

(3) On the other hand, in a pigment ink provided with a non-Newtonian viscosity, the pigment settles down with the passage of time when natural polysaccharides are added to the ink. If the nonionic high molecular surfactant of the present invention is added, the pigment does not settle down with the passage of time even at a high temperature, and thus the ink is stabilized in terms of the physical properties. The mechanism thereof is not clear, and it is anticipated that a hydroxyl group of the natural polysaccharides constructs a net work structure with an alkylene oxide chain of the nonionic high molecular surfactant and that the nonionic high molecular surfactant has an adsorbing ability to the pigment, so that a firm net work structure including the pigment is formed. Further, the same shall apply in the case that the colorant is a dye, and a firm net work is formed between the nonionic high molecular surfactant and the non-Newtonian property-providing agent, so that the physical properties of the ink are stabilized.

A content of the nonionic high molecular surfactant having the characteristics described above used in the present invention has to be set to 0.1 to 30% by weight (hereinafter referred to merely as "%"), preferably 0.5 to 15% based on the total amount of the ink composition.

If the content is less than 0.1%, the writing feeling is not improved. On the other hand, if it exceeds 30%, the viscosity grows high and can not be set to the target viscosity in the case of an ink having a Newtonian viscosity, and in the case of an ink having a non-Newtonian viscosity, a content of the non-Newtonian viscosity-providing agent has to be restricted when it is set to the target viscosity. As a result, the net work structure does not become firm, and the problem that the pigment settles down is brought about.

The colorant used in the present invention shall not specifically be restricted, and capable of being used are any compounds selected from inorganic and organic pigments, water-soluble dyes and oil-soluble dyes which are dissolved in water in a low concentration, all of which have so far conventionally been used for water-based ink compositions.

The inorganic pigments include, for example, titanium oxide, carbon black and metal powders, and the organic pigments include, for example, azo lake, insoluble azo pigments, chelate azo pigments, phthalocyanine pigments, perylene and perinone pigments, anthraquinone pigments, quinacridone pigments, dye lakes, nitro pigments and nitroso pigments.

To be specific, capable of being used are phthalocyanine blue (C. I. 74160), phthalocyanine green (C. I. 74260), hansa yellow 3G (C. I. 11670), disazo yellow GR (C. I. 21100), naphthol red (C. I. 12390), permanent red 4R (C. I. 12335), brilliant carmine 6B (C. I. 15850) and quinacridone red (C. I. 46500).

All of direct dyes, acid dyes, food dyes and basic dyes can be used for the water-soluble dyes.

The direct dyes which can be used include, for example, C. I. direct black 17, ditto 19, ditto 22, ditto 32, ditto 38, ditto 51 and ditto 71, C. I. direct yellow 4, ditto 26, ditto 44 and ditto 50, C. I. direct red 1, ditto 4, ditto 23, ditto 31, ditto 37, ditto 39, ditto 75, ditto 80, ditto 81, ditto 83, ditto 225, ditto 226 and ditto 227, C. I. direct blue 1, ditto 15, ditto 71, ditto 86, ditto 106 and ditto 119.

The acid dyes which can be used include, for example, C. I. acid black 1, ditto 2, ditto 24, ditto 26, ditto 31, ditto 52, ditto 107, ditto 109, ditto 110, ditto 119 and ditto 154, C. I. acid yellow 7, ditto 17, ditto 19, ditto 23, ditto 25, ditto 29, ditto 38, ditto 42, ditto 49, ditto 61, ditto 72, ditto 78, ditto 110, ditto 141, ditto 127, ditto 135 and ditto 142, C. I. acid red 8, ditto 9, ditto 14, ditto 18, ditto 26, ditto 27, ditto 35, ditto 37, ditto 51, ditto 52, ditto 57, ditto 82, ditto 87, ditto 92, ditto 94, ditto 111, ditto 129, ditto 131, ditto 138, ditto 186, ditto 249, ditto 254, ditto 265, ditto 276, C. I. acid violet 15 and ditto 17, C. I. acid blue 1, ditto 7, ditto 9, ditto 15, ditto 22, ditto 23, ditto 25, ditto 40, ditto 41, ditto 43, ditto 62, ditto 78, ditto 83, ditto 90, ditto 93, ditto 103, ditto 112, ditto 113 and ditto 158, C. I. acid green 3, ditto 9, ditto 16, ditto 25 and ditto 27.

A great part of the food dyes is included in the direct dyes or the acid dyes, and one example which is not included therein is C. I. food yellow 3.

The basic dyes which can be used include, for example, C. I. basic yellow 1, ditto 2 and ditto 21, C. I. basic orange 2, ditto 14 and ditto 32, C. I. basic red 1, ditto 2, ditto 9 and ditto 14, C. I. basic violet 1, ditto 3 and ditto 7, C. I. basic green 4, C. I. basic brown 12, C. I. basic black 2 and ditto 8.

The oil-soluble dyes include, for example, Balifast Black 1802, Balifast Black 1807, Balifast Violet 1701, Balifast Violet 1702, Balifast Blue 1603, Balifast Blue 1605, Balifast Blue 1601, Balifast Red 1308, Balifast Red 1320, Balifast Red 1355, Balifast Red 1360, Balifast Yellow 1101, Balifast Yellow 1105, Balifast Green 1501, nigrosine base EXBP, nigrosine base EX, Base of basic dyes ROB-B, Base of basic dyes RO6G-B, Base of basic dyes VB-B, Base of basic dyes VPB-B and Base of basic dyes MVB-3 (manufactured by Orient Chemical Ind. Ltd.), Aizen spilon Black GMH-special, Aizen spilon Violet C-RH, Aizen spilon Blue GNH, Aizen spilon Blue 2BNH, Aizen spilon Blue C-RH, Aizen spilon Red C-GH, Aizen spilon Red C-BH, Aizen spilon Yellow C-GNH, Aizen spilon Yellow C-2GH, S.P.T Red 522, S.P.T Blue 111, S.P.T Blue GLSH special, S.P.T Red 533, S.P.T Orange 6, S.B.N Violet 510, S.B.N Yellow 510 and S.B.N Yellow 530 (manufactured by Hodogaya Chemical Co., Ltd.).

When using these oil-soluble dyes, the dyes can be improved in solubility by dissolving an organic solvent in the vehicles.

These colorants may be used alone or in combination of two or more kinds thereof.

A content of these colorants falls in a range of 0.05 to 30%, preferably 1 to 15% based on the total amount of the ink composition.

If a content of the colorant is less than 0.05%, coloring is weakened, and the hue in writing on paper is uncertain. Accordingly, such a content is not preferred. On the other hand, it exceeds 30%, the pigment is coagulated or the dye is deposited when stored over a long period of time to clog the pen tip, which results in causing inferior writing. Accordingly, such a content is not preferred as well.

Refined water, distilled water, ion-exchanged water, purified water and deep sea water can be used as water used in the present invention. A content thereof is controlled in a range of 30 to 90% based on the total amount of the ink composition.

The water-based ink composition of the present invention contains the respective components described above, and depending on the kinds of the ink (a gel ink, a low viscosity ink and the like) and the uses of the writing instrument (a ballpoint pen, a marking pen, a fountain pen and the like), it can further contain, if necessary, various components (optional components) which are usually used for the above uses, for example, humectants, lubricants, preservatives, pH controlling agents, resin emulsions, corrosion inhibitors, thickeners and the like.

A water-soluble organic solvent can be used as the humectant for preventing the pen tip from drying. The water-soluble organic solvent includes, for example, water-soluble polyhydric alcohols such as ethylene glycol, propylene glycol, diethylene glycol and glycerin, cellosolves such as ethylene glycol monomethyl ether (methyl cellosolve) and ethylene glycol monoethyl ether (ethyl cellosolve), carbitols such as diethylene glycol monomethyl ether (methyl carbitol) and diethylene glycol monoethyl ether (ethyl carbitol) and glycol ether esters such as ethylene glycol monomethyl ether acetate. Derivatives of glycerin, diglycerin and polyglycerin can be added to the ink for the purpose of obtaining the same effects as those of the organic solvents due to the moisture holding effect.

A content of these water-soluble organic solvents falls in a range of usually 40% or less, preferably 5 to 40% based on the total amount of the ink composition. If the content of the water-soluble organic solvents exceeds 40%, the drawn lines are less liable to be dried, and therefore such a range is not preferred.

Capable of being given as the lubricant are, for example, fatty acid salts such as potassium linoleate, sodium ricinoleate, potassium oleate and sodium oleate and in addition thereto, respective surfactants such as nonionic surfactants and anionic surfactants described below.

The nonionic surfactants which can be used include, for example, polyoxyalkylene higher fatty acid esters, higher fatty acid esters of polyhydric alcohols and derivatives thereof and higher fatty acid esters of sugar, and to be specific, they include glycerin fatty acid esters, polyglycerin fatty acid esters, propylene glycol fatty acid esters, pentaerythritol fatty acid esters, polyoxyethylene sorbitan fatty acid esters, polyoxyethylene sorbit fatty acid esters, polyoxyethylene glycerin fatty acid esters, polyethylene glycol fatty acid esters, polyoxyethylene alkyl ethers, polyoxyethylene styrenated phenyl ethers, polyoxyethylene phytosterol, polyoxyethylene polyoxypropylene alkyl ethers, polyoxyethylene alkylphenyl ethers, polyoxyethylene castor oil, polyoxyethylene lanolin, polyoxyethylene lanolin alcohols, polyoxyethylene alkylamines, polyoxyethylene fatty acid amides and polyoxyethylene alkylphenyl formaldehyde condensed products. These nonionic surfactants are different in action thereof from the nonionic high molecular surfactant having the characteristics described above used in the present invention and distinguished therefrom.

The anionic surfactants include, for example, alkylated sulfonic acid salts of higher fatty acid amides and alkylaryl sulfonates, and to be specific, they include alkylsulfates, polyoxyethylene alkyl ether sulfates, N-acylamino acid salts, N-acylmethyltaurine salts, polyoxyethylene alkyl ether acetates, alkylphosphates and polyoxyethylene alkyl ether phosphates.

Particularly in the case of a low viscosity ink (about 10 mPa·s), a content of these lubricants is preferably 0.01 to 2.0%, more preferably 0.05 to 1.5% and particularly preferably 0.1 to 1.2% based on the total amount of the ink composition from the viewpoint of the non-feathering property. When the viscosity is 100 to 4000 mPa·s (at a shear speed of 3.84 s$^{-1}$) in an ink having non-Newtonian viscosity, the content may not be restricted because of the viscosity effect thereof.

The preservatives include, for example, phenol, isopropylmethylphenol, sodium pentachlorophenol, benzoic acid, sodium benzoate, dehydroacetic acid, sodium dehydroacetate, sorbic acid, potassium sorbate, sodium 2-pyridinethiol-1-oxide, 1,2-benzoisothiazoline-3-one, 5-chloro-2-methyl-4-isothiazoline-3-one, 2,4-thiazoline benzimidazole and paraoxybenzoic acid esters.

The pH controlling agents include amines or bases, for example, various organic amines such as aminotriethanolamine, monoethanolamine and diethanolamine, inorganic alkali agents including hydroxides of alkali metals such as sodium hydroxide, lithium hydroxide and potassium hydroxide and ammonia.

The resin emulsions include as well an alkali thickening type, and they are added as a viscosity controlling agent, a pigment dispersant or a water resistance-providing agent. They include, for example, polyvinyl chloride, polyvinylidene chloride, polystyrene, polyethylene, polycarbonate, polyurethane, polymethyl methacrylate, benzoguanamine resins, styrene.acrylonitrile copolymers, acryl.methyl methacrylate.styrene copolymers, alkyl acrylate copolymers, acrylonitrile.alkyl acrylate copolymers, styrene.alkyl acrylate copolymers, styrene.alkyl methacrylate.alkyl acrylate copolymers, styrene.acrylonitrile.alkyl methacrylate.alkyl acrylate copolymers, alkyl methacrylate.alkyl acrylate copolymers, acrylic acid.methacrylic acid-alkyl acrylate copolymers and vinylidene chloride.alkyl acrylate copolymers.

The thickeners are roughly divided into organic thickeners and inorganic thickeners, and acryl base synthetic polymers, natural gum, cellulose and polysaccharides can be used as the organic thickeners. To be specific, they include gum arabic, tragacanth gum, guar gum, locust bean gum, alginic acid, carrageenan, gelatin, casein, xanthan gum, succinoglycan, alcalan, dextran, methyl cellulose, ethyl cellulose, hydroxyethyl cellulose, carboxymethyl cellulose, starch, sodium glycolate, propylene glycol alginate, polyvinyl alcohol, polyvinylpyrrolidone, polyvinyl methyl ether, poly(sodium acrylate), carboxyvinyl polymers, polyethylene oxide, copolymers of vinyl acetate and polyvinylpyrrolidone, cross-linking type acrylic acid polymers and salts of styrene acrylic acid copolymers.

The inorganic thickeners include, for example, clays such as smectite, bentonite and diatomaceous earth and fine particles of silicon dioxide.

A content of these thickeners are suitably increased or decreased according to a viscosity value of the ink.

The corrosion inhibitors include, for example, tolyltiazole, benzotriazole and derivatives thereof, fatty acid phosphorus derivatives such as octyl phosphate and dioctyl thiophosphate, imidazole, benzoimidazole and derivatives thereof, 2-mercaptobenzothiazole, octylmethanesulfonate, dicyclohexylammonium.nitrite, diisopropylammonium.nitrite, propargyl alcohol and dialkylthiourea.

A pH of the water-based ink composition of the present invention is different according to the specifications of the writing instruments (pens).

That is, in the case of a marking pen, the pH does not have to be specifically adjusted excluding a case where an additive of an alkali-dissolving type is used. In contrast with this, in the case of a ballpoint pen and a fountain pen in which a metallic material is used for a pen tip, the ink composition is controlled preferably to a pH falling in a range of 7 to 10 (measuring temperature: 25° C., measuring instrument: pH meter manufactured by Horiba Ltd.).

The pH is controlled to the range (7 to 10) described above in order to not only prevent the metallic ballpoint pen tip from being corroded but also prevent the dispersant used for dispersing the pigment from coagulating and the acid dye used for a colorant from not being dissolved.

In the case of a ballpoint pen, a ballpoint pen tip is usually constituted of a ball and a holder, and when at least a part thereof is constituted of metal, attentions have to be paid to rust. In the case of a water-based ink as is the case with the present invention, rust preventive measure is an essential condition. For example, when conventional tungsten carbide is used as a material for a ballpoint pen tip, an adverse effect is not exerted on the writing performance by elution of cobalt and tungsten as long as the pH falls in the range (7 to 10) described above, and therefore it is preferred.

When a metal piece which is liable to rust is used, a rust preventive measure is required in a mechanism such as that of a fountain pen. However, when a plastic piece is used, pH control for a rust preventive measure is not required.

The water-based ink composition of the present invention can be used in a wide area of a viscosity. In the case that an ink having a Newtonian viscosity has a low viscosity of 1 to 10 mPa·s, the excellent effect is exerted on the non-feathering property and the writing feeling.

Also, in the case of an ink having a viscosity of 10 to 100 mPa·s, the same effects as in the low viscosity ink described above can be expected. Further, in the case of an ink having a non-Newtonian viscosity which has a viscosity of 100 to 4000 mPa·s at a shear speed of $3.84\ s^{-1}$, a firm net work structure is constructed with the non-Newtonian viscosity-providing agent and the high molecular surfactant, and the physical properties can be stabilized.

A surface tension of the water-based ink composition of the present invention is preferably suitably set to a range of 16 to 45 mN/m (measuring temperature: 25° C., measuring device: surface tension measuring meter manufactured by Kyowa Interface Science Co., Ltd.) considering a viscosity of the ink and the kind of the writing instrument.

For example, when the water-based ink composition of the present invention is used for a writing instrument of a free ink and direct storage type described later in the form of a low viscosity ink having a viscosity of 1 to 10 mPa·s (25° C.), a surface tension of the ink is controlled to preferably 35 to 45 mM/mm, more preferably 37 to 42 mM/mm and particularly preferably 38 to 40 mM/mm in order to maintain the quality of the pen. When used for a writing instrument of a sliver type described later in the same viscosity, a surface tension of the ink is controlled to preferably 25 to 40 mM/m, more preferably 27 to 38 mM/m and particularly preferably 30 to 36 mM/m in order to maintain the quality of the pen.

In the writing instruments of the respective types described above, if the surface tensions of the inks each fall below the preferred ranges described above (less than the minimum values in the respective ranges), the drawn lines are liable to be blurred, and adverse effects (point leaking, blowing and the like) are exerted on the quality of the pens in a certain case. On the other hand, if the surface tensions exceed the preferred ranges described above (the maximum values in the respective ranges), the pens are reduced in writing feeling and discharge stability in a certain case.

On the other hand, in the water-based ink composition of the present invention, when an ink provided with a pseudo plasticity has an intermediate viscosity of a viscosity of 100 to 4000 mPa·s (25° C.) at a shear speed of $3.84\ s^{-1}$ or when an ink having a Newtonian viscosity has a viscosity of 10 to 100 mPa·s (25° C.), the surface tension is controlled so that it falls in a range of preferably 16 to 38 mN/m, more preferably 17 to 35 mN/m and particularly preferably 20 to 33 mN/m.

If the surface tension is less than 16 mN/m, the point leaking phenomenon is liable to be caused, and the pigment is liable to be settled and coagulate. On the other hand, if it exceeds 38 mN/m, a blobbing phenomenon and a splitting phenomenon are liable to be caused, and the ink discharge becomes unstable depending on the storing environment and the writing state, so that intensity and a width of the drawn lines are liable to be scattered in a certain case.

The water-based ink composition of the present invention thus constituted is used for various writing instruments. That is, it can be used for a ball point pen equipped with an ink reservoir filled with the water-based ink comprising various components described above (the colorant, water, the non-ionic high molecular surfactant and various optional components) and a pen tip having a tip holder formed from a material comprising at least one selected from the group consisting of metal materials such as stainless, brass and nickel silver and a ball made of a material comprising at least one selected from the group consisting of hard metal, zirconia, silicon carbide and a stainless steel, or a marking pen equipped with a pen feed formed by bundling synthetic fibers into a cylindrical form, or a fountain pen having a metal piece and a plastic piece at a pen tip to induce an ink by virtue of capillary force in the metal piece and the plastic piece.

The structure of the writing instrument in which the water-based ink composition of the present invention is used includes, for example, a sliver type writing instrument and a free ink type writing instrument in which an ink is stored directly in the reservoir.

Among the sliver type writing instrument and the free ink type writing instrument described above, the sliver type writing instrument includes a sliver type ballpoint pen constituted from a barrel housing therein a sliver in which the water-based ink composition of the present invention is occluded, a feeder comprising a fiber bundle connected to the sliver and a pen tip comprising a ball and a tip holder, and a sliver type marking pen comprising the sliver occluded the ink and a pen feed formed by bundling synthetic fibers into a cylindrical form.

Two kinds of the free ink type writing instrument are available, and they include a writing instrument constituted from an ink tank directly storing an ink, an ink holder temporarily holding the ink so that the ink pressed out from the ink tank when air in the above ink tank expands by a rise in the temperature does not fall in blobs from a pen tip (or a pen feed) and an air vent, a pen tip comprising a ball and a pen holder or a pen feed formed by bundling synthetic fibers into a cylindrical form or a fountain pen tip having a pen tip comprising metal and plastic pieces (hereinafter referred to as "a direct storage type") and a writing instrument constituted from a tube directly storing an ink, a pen tip comprising a ball and a pen holder or a pen feed formed by bundling synthetic fibers into a cylindrical form and a fountain pen tip having a pen tip comprising metal and plastic pieces (hereinafter referred to as "a storage type").

The writing instruments shown above can be selectively used depending on the viscosity ranges of the water-based ink composition of the present invention. For example, the ink having a viscosity of 1 to 10 mPa·s is suitably used for a pen of sliver type and a free ink pen of direct storage type. The ink having a viscosity of 100 to 4000 mPa·s at a shear speed of $3.84\ s^{-1}$ or an ink having a Newtonian viscosity in which its viscosity is 10 to 100 mPa·s is used for a free ink pen of storage type.

The water-based ink composition thus constituted in the present invention contains 0.1 to 30% of the nonionic high molecular surfactant having the characteristics described above, whereby the quality satisfying all of the writing feeling, the non-feathering property and the stability with the passage of time can be obtained. The mechanism thereof has been described above; that is, the writing feeling is improved by swelling of a paper face by water hydrated to an alkylene oxide chain; in respect to the non-feathering property, the low molecular surfactant is adsorbed on the nonionic high molecular surfactant, whereby it is prevented from selectively penetrating into a paper face; and in respect to the pigment settling property with the passage of time in the non-Newtonian viscosity pigment ink, a firm net work is constructed by the non-Newtonian property-providing agent and the alkylene oxide chain, whereby the excellent physical property stability can be exhibited.

The writing instrument (a ballpoint pen, a marking pen and a fountain pen) according to the present invention uses the water-based ink composition of the present invention and therefore is excellent in a non-feathering property, writing feeling and physical property stability.

EXAMPLES

Next, the present invention shall be explained in further detail with reference to examples and comparative examples, but the present invention shall by no means be restricted by the examples described below. A blending unit in the following examples is % by weight, wherein the total amount corresponds to 100% by weight.

Example 1

The respective components described below were mixed and stirred for 3 hours, and then they were dispersed by means of a sand mill for 5 hours to prepare a water-based black pigment ink for a ballpoint pen.

| | |
|---|---|
| Colorant: Carbon Black MA-100 (manufactured by Mitsubishi Chemicals Corporation) | 8.0 |
| Nonionic high molecular surfactant: Discol N-509 (average molecular weight: 20,000, HLB: 9, manufactured by Daiichi Kogyo Seiyaku Co., Ltd.) | 2.0 |
| Solvent: glycerin | 10.0 |
| propylene glycol | 10.0 |
| pH controlling agent: triethanolamine | 2.0 |
| aminomethylpropanol | 0.2 |
| Lubricant: polyoxyethylene alkyl ether phosphate (Plysurf A-219B, manufactured by Daiichi Kogyo Seiyaku Co., Ltd.) | 0.1 |
| Rust preventive: benzotriazole | 0.3 |
| Preservative: 1,2-benzoisothiazoline-3-one (Proxel BDN: manufactured by Zeneca Co., Ltd.) | 0.1 |
| Refined water | balance |

Comparative Example 1

A water-based black ink for a ballpoint pen was prepared in the same manner as in Example 1 described above, except that the same amount of a styrene acrylic acid resin ammonium salt was substituted for the nonionic high molecular surfactant used in Example 1.

Example 2

The components were mixed and stirred for 3 hours according to a blending formation described below to prepare a water-based fluorescent green ink for a marking pen.

| | |
|---|---|
| Colorant: NKW3902 green toner (manufactured by Nippon Keiko Co., Ltd.) | 50.0 |
| Solvent: glycerin | 10.0 |
| Humectant: urea | 10.0 |
| Nonionic high molecular surfactant: Discol N-518 (average molecular weight: 80,000, HLB: 18, manufactured by Daiichi Kogyo Seiyaku Co., Ltd.) | 0.5 |

-continued

| | |
|---|---|
| Preservative: Bioace (isothiazoline base preservative, manufactured by KI Kasei Co., Ltd.) | 0.3 |
| Refined water | balance |

Comparative Example 2

A water-based fluorescent green ink for a marking pen was prepared in the same manner as in Example 2 described above, except that the same amount of refined water was substituted for the nonionic high molecular surfactant used in Example 2.

Example 3

A non-Newtonian viscosity water-based red pigment ink for a ballpoint pen was prepared in the same manner as in Example 1 according to the following blending formation.

| | |
|---|---|
| Colorant: naphthol red (Sumitone Scarlet: manufactured by Sumitomo Chemical Co., Ltd.) | 6.0 |
| Solvent: glycerin | 4.0 |
| Solvent: ethylene glycol | 20.0 |
| Dispersant: styrene acrylic acid resin ammonium salt | 3.0 |
| Nonionic high molecular surfactant: Discol N-518 (average molecular weight: 80,000, HLB: 18, manufactured by Daiichi Kogyo Seiyaku Co., Ltd.) | 2.0 |
| Lubricant: polyoxyethylene alkyl ether phosphate (RS-410, manufactured by Toho Chemical Industry Co., Ltd., hereinafter the same shall apply) | 1.0 |
| pH controlling agent: aminomethylpropanol | 0.5 |
| Thickener: xanthan gum | 0.3 |
| Preservative: 1,2-benzoisothiazoline-3-one (Proxel BDN: manufactured by Zeneca Co., Ltd.) | 0.1 |
| Rust preventive: benzotriazole | 0.3 |
| Refined water | balance |

Comparative Example 3

A non-Newtonian viscosity water-based red pigment ink for a ballpoint pen was prepared in the same manner as in Example 3 described above, except that the same amount of refined water was substituted for the nonionic high molecular surfactant used in Example 3.

Example 4

The respective components described below were mixed and stirred for 3 hours to prepare a water-based black dye ink for a fountain pen.

| | |
|---|---|
| Colorant: Water Black 187LM (black dye ink manufactured by Orient Chemical Ind., Ltd.) | 5.0 |
| Nonionic high molecular surfactant: Discol N-509 (average molecular weight: 20,000, HLB: 9, manufactured by Daiichi Kogyo Seiyaku Co., Ltd) | 2.0 |
| Solvent: glycerin | 10.0 |
| Solvent: diethylene glycol | 10.0 |
| Lubricant: polyoxyethylene alkyl ether phosphate | 0.1 |

-continued

| | |
|---|---|
| pH controlling agent: triethanolamine | 2.0 |
| Preservative: 1,2-benzoisothiazoline-3-one (Proxel BDN: manufactured by Zeneca Co., Ltd.) | 0.1 |
| Rust preventive: benzotriazole | 0.3 |
| Refined water | balance |

Comparative Example 4

A water-based black dye ink for a fountain pen was prepared in the same manner as in Example 4 described above, except that the same amount of refined water was substituted for the nonionic high molecular surfactant used in Example 4.

Example 5

The respective components described below were mixed and stirred for 3 hours, and then they were dispersed by means of a sand mill for 5 hours to prepare a water-based black pigment ink for a ballpoint pen.

| | |
|---|---|
| Colorant: Carbon Black MA-100 (manufactured by Mitsubishi Chemicals Corporation) | 8.0 |
| Nonionic high molecular surfactant: Epan 785 (average molecular weight: 13333, cloud point: 100° C. or higher, manufactured by Daiichi Kogyo Seiyaku Co., Ltd.) | 1.5 |
| Solvent: glycerin | 10.0 |
| propylene glycol | 10.0 |
| pH controlling agent: triethanolamine | 2.0 |
| aminomethylpropanol | 0.2 |
| Lubricant: polyoxyethylene alkyl ether phosphate (Plysurf A-219B, manufactured by Daiichi Kogyo Seiyaku Co., Ltd.) | 0.1 |
| Rust preventive: benzotriazole | 0.3 |
| Preservative: 1,2-benzoisothiazoline-3-one (Proxel BDN: manufactured by Zeneca Co., Ltd.) | 0.1 |
| Refined water | balance |

Comparative Example 5

A water-based black ink for a ballpoint pen was prepared in the same manner as in Example 5 described above, except that the same amount of a styrene acrylic acid resin was substituted for the nonionic high molecular surfactant used in Example 5.

Example 6

The components were mixed and stirred for 3 hours according to a blending formation described below to prepare a water-based fluorescent green ink for a marking pen.

| | |
|---|---|
| Colorant: NKW3902 green toner (manufactured by Nippon Keiko Co., Ltd.) | 50.0 |
| Nonionic high molecular surfactant: Epan 740 (average molecular weight: 3333, cloud point: 55° C., manufactured by Daiichi Kogyo Seiyaku Co., Ltd.) | 0.5 |
| Solvent: glycerin | 10.0 |
| Humectant: urea | 10.0 |

-continued

| | |
|---|---|
| Preservative: Bioace (isothiazoline base preservative, manufactured by KI Kasei Co., Ltd.) | 0.3 |
| Refined water | balance |

Comparative Example 6

A water-based fluorescent green ink for a marking pen was prepared in the same manner as in Example 6 described above, except that the same amount of refined water was substituted for the nonionic high molecular surfactant used in Example 6.

Example 7

A non-Newtonian viscosity water-based red pigment ink for a ballpoint pen was prepared in the same manner as in Example 5 according to the following blending formation.

| | |
|---|---|
| Colorant: naphthol red (Sumitone Scarlet: manufactured by Sumitomo Chemical Co., Ltd.) | 6.0 |
| Nonionic high molecular surfactant: Epan 485 (average molecular weight: 8000, cloud point: 100° C. or higher, manufactured by Daiichi Kogyo Seiyaku Co., Ltd.) | 2.0 |
| Solvent: glycerin | 4.0 |
| Solvent: propylene glycol | 20.0 |
| Dispersant: styrene acrylic acid resin ammonium salt | 3.0 |
| Lubricant: polyoxyethylene alkyl ether phosphate (RS-410, manufactured by Toho Chemical Industry Co., Ltd.) | 1.0 |
| pH controlling agent: aminomethylpropanol | 0.5 |
| Thickener: xanthan gum | 0.3 |
| Preservative: 1,2-benzoisothiazoline-3-one (Proxel BDN: manufactured by Zeneca Co., Ltd.) | 0.1 |
| Rust preventive: benzotriazole | 0.3 |
| Refined water | balance |

Comparative Example 7

A non-Newtonian viscosity water-based red pigment ink for a ballpoint pen was prepared in the same manner as in Example 7 described above, except that Epan 410 (average molecular weight: 1333, cloud point: 35° C., manufactured by Daiichi Kogyo Seiyaku Co., Ltd.) was substituted for the nonionic high molecular surfactant used in Example 7.

Example 8

The respective components described below were mixed and stirred for 3 hours to prepare a water-based black dye ink for a fountain pen.

| | |
|---|---|
| Colorant: Water Black 187LM (black dye toner manufactured by Orient Chemical Ind. Co., Ltd.) | 5.0 |
| Nonionic high molecular surfactant: Epan 680 (average molecular weight: 8750, cloud point: 100° C. or higher, manufactured by Daiichi Kogyo Seiyaku Co., Ltd.) | 1.0 |
| Solvent: glycerin | 10.0 |
| Solvent: diethylene glycol | 10.0 |

-continued

| | |
|---|---|
| Lubricant: polyoxyethylene alkyl ether phosphate (Plysurf A-219B, manufactured by Daiichi Kogyo Seiyaku Co., Ltd.) | 0.1 |
| pH controlling agent: triethanolamine | 2.0 |
| Preservative: 1,2-benzoisothiazoline-3-one (Proxel BDN: manufactured by Zeneca Co., Ltd.) | 0.1 |
| Rust preventive: benzotriazole | 0.3 |
| Refined water | balance |

Comparative Example 8

A water-based black dye ink for a fountain pen was prepared in the same manner as in Example 8 described above, except that the same amount of Epan 720 (average molecular weight: 2500, cloud point: 25° C., manufactured by Daiichi Kogyo Seiyaku Co., Ltd.) was substituted for the nonionic high molecular surfactant used in Example 8.

The respective water-based ink compositions obtained in Examples 1 to 8 and Comparative Examples 1 to 8 were measured for a pH, a surface tension and a viscosity by the respective methods described below. The results thereof are shown in the following Table 1.

Measuring Method of pH:

Measured by means of a pH meter (measuring temperature: 25° C.) manufactured by Horiba, Ltd.

Measurement of Surface Tension:

Measured by means of a surface tension measuring equipment (measuring temperature: 25° C.) manufactured by Kyowa Interface science Co., Ltd.

Measurement of Viscosity:

Measured by means of an ELD type viscometer (measuring temperature: 25° C.) manufactured by Tokimec Inc.

The respective writing instruments (1) to (4) having the following specifications were charged with the ink compositions obtained in the respective examples and comparative examples and assembled.

(1) Free ink, direct storage type ballpoint pen (ball diameter φ: 0.7 mm): Examples 1 and 5 and Comparative Examples 1 and 5
(2) Sliver type marking pen: Examples 2 and 6 and Comparative Examples 2 and 6
(3) Free ink, storage type ballpoint pen (ball diameter φ: 0.7 mm): Examples 3 and 7 and Comparative Examples 3 and 7
(4) Free ink, direct storage type fountain pen: Examples 4 and 8 and Comparative Examples 4 and 8

Writing instruments of each 5 pens×4 kinds were prepared in the combinations and the specifications described above to evaluate a storing property (physical property stability with the passage of time), a feathering property and writing feeling. The results thereof are shown in the following Table 1.

Evaluation Method of Storing Property (Physical Property Stability with the Passage of Time):

The test inks were evaluated for ink physical property stability according to the following evaluation criteria after one month passed at 50° C. in bulk. In particular, the pigment inks were evaluated as well for coagulation and settling of the pigment.

Evaluation Criteria:

○: no change in physical property stability with the passage of time

X: viscosity tends to increase or pigment tends to settle down with the passage of time Evaluation Method of Feathering Property:

The Japanese characters "Mitsubishi Pencil" were written on a manuscript paper with the respective writing instruments and evaluated according to the following evaluation criteria.

Evaluation Criteria:

○: no feathering

Δ: a little feathering

X: heavy feathering

Evaluation Method of Writing Feeling:

Spiral lines and the Japanese characters "Mitsubishi Pencil" were written on a manuscript paper with the respective writing instruments and evaluated according to the following evaluation criteria.

Evaluation Criteria:

○: good writing feeling

Δ: heavy writing feeling in writing "Mitsubishi Pencil"

X: scratchy writing feeling in writing both of spiral lines and "Mitsubishi Pencil"

TABLE 1

| | Physical properties of ink | | | Evaluation | | |
|---|---|---|---|---|---|---|
| | Ink pH | Ink surface tension (mN/m) | Ink viscosity (mPa · s) | Storing property | Non-feathering property | Writing feeling |
| Example 1 | 8.5 | 40.5 | 4.7 | ○ | ○ | ○ |
| Example 2 | 5.6 | 35.0 | 5.0 | ○ | ○ | ○ |
| Example 3 | 8.5 | 32.7 | 1080 | ○ | ○ | ○ |
| Example 4 | 8.5 | 39.0 | 3.5 | ○ | ○ | ○ |
| Example 5 | 8.5 | 40.0 | 4.2 | ○ | ○ | ○ |
| Example 6 | 5.6 | 33.5 | 4.8 | ○ | ○ | ○ |
| Example 7 | 8.5 | 32.5 | 975 | ○ | ○ | ○ |
| Example 8 | 8.5 | 38.7 | 3.1 | ○ | ○ | ○ |
| Comparative Example 1 | 8.5 | 41.5 | 4.3 | ○ | X | Δ |
| Comparative Example 2 | 5.6 | 35.4 | 4.5 | ○ | Δ | X |
| Comparative Example 3 | 8.5 | 33.0 | 853 | X | ○ | ○ |

TABLE 1-continued

|  | Physical properties of ink | | | Evaluation | | |
| --- | --- | --- | --- | --- | --- | --- |
|  | Ink pH | Ink surface tension (mN/m) | Ink viscosity (mPa · s) | Storing property | Non-feathering property | Writing feeling |
| Comparative Example 4 | 8.5 | 39.7 | 3.0 | ○ | X | Δ |
| Comparative Example 5 | 8.5 | 41.5 | 4.3 | ○ | X | Δ |
| Comparative Example 6 | 5.6 | 35.4 | 4.5 | ○ | Δ | X |
| Comparative Example 7 | 8.5 | 32.9 | 920 | X | ○ | ○ |
| Comparative Example 8 | 8.5 | 37.7 | 3.3 | X | X | ○ |

As apparent from the results shown in Table 1 described above, it has become clear that the writing instruments prepared in Examples 1 to 8 falling in the scope of the present invention are excellent in a non-feathering property, writing feeling and physical property stability as compared with those prepared in Comparative Examples 1 to 8 falling outside the scope of the present invention.

What is claimed is:

1. A ballpoint pen using a water-based ink composition comprising at least a colorant, water and 0.1 to 30% by weight of N-polyoxyalkylenepolyalkylenepolyamine having an average molecular weight of 20,000 to 80,000 and having an HLB of 8 or more or a cloud point of 50° C. or higher and which contains a non-Newtonian viscosity-providing agent and has a viscosity of 100 to 4000 mPa·s at a shear speed of $3.84s^{-1}$.

2. The ballpoint pen as described in claim 1, wherein N-polyoxyalkylenepolyalkylenepolyamine has an average molecular weight of 50,000 to 80,000.

3. A ballpoint pen using a water-based ink composition which comprises at least a colorant, water and 0.1 to 30% by weight of N-polyoxyethylenepolyoxypropylene block polymer having an average molecular weight of 20,000 to 80,000 and having an HLB of 8 or more or a cloud point of 50° C. or higher and which contains a non-Newtonian viscosity-providing agent and has a viscosity of 100 to 4000 mPa·s at a shear speed of $3.84s^{-1}$.

* * * * *